United States Patent
Croak et al.

(10) Patent No.: US 8,615,003 B1
(45) Date of Patent: Dec. 24, 2013

(54) METHOD AND APPARATUS FOR HANDLING NETWORK ELEMENT TIMEOUTS IN A PACKET-SWITCHED COMMUNICATION NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1403 days.

(21) Appl. No.: 11/261,694

(22) Filed: Oct. 28, 2005

(51) Int. Cl.
  *H04L 12/66* (2006.01)
  *H04L 12/26* (2006.01)
  *H04M 3/00* (2006.01)

(52) U.S. Cl.
  USPC .................... 370/352; 370/241; 379/190

(58) Field of Classification Search
  USPC .................... 379/190; 370/241, 517, 519
  See application file for complete search history.

(56) References Cited

U.S. PATENT DOCUMENTS

| | | | |
|---|---|---|---|
| 5,815,667 A * | 9/1998 | Chien et al. | 709/232 |
| 6,763,020 B1 * | 7/2004 | Hon | 370/356 |
| 6,992,982 B1 * | 1/2006 | Meyer et al. | 370/231 |
| 7,180,871 B1 * | 2/2007 | Khaflzov et al. | 370/252 |
| 7,417,956 B2 * | 8/2008 | Nakazawa | 370/252 |
| 7,453,993 B2 * | 11/2008 | Watts et al. | 379/88.17 |
| 7,492,780 B1 * | 2/2009 | Goolsby | 370/412 |
| 7,613,976 B2 * | 11/2009 | Ludwig et al. | 714/748 |
| 2002/0141392 A1 * | 10/2002 | Tezuka et al. | 370/352 |

* cited by examiner

*Primary Examiner* — Asad Nawaz
*Assistant Examiner* — Joel Hamel

(57) ABSTRACT

Method and apparatus for handling timeouts in a packet-switched communication network is described. In one example, at least one timeout condition of a network element is identifies in the packet-switched communication network. Packet delay is determined in a transport network of the packet-switched communication network in response to the at least one timeout condition. The packet delay is compared to a threshold packet delay. A timeout parameter of the network element is automatically adjusted if the packet delay satisfies the threshold packet delay.

8 Claims, 4 Drawing Sheets

METHOD AND APPARATUS FOR HANDLING NETWORK ELEMENT TIMEOUTS IN A PACKET-SWITCHED COMMUNICATION NETWORK

BACKGROUND OF THE INVENTION

1. Field of the Invention

Embodiments of the present invention generally relate to telecommunications systems and, more particularly, to a method and apparatus for handling network element timeouts in a packet-switched communication network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VOIP) network.

In a VOIP network, service logic for processing calls in real time is often accessed by servers with backend data stores. The service logic may include, for example, personal preferences of users, such as instructions and preferences for routing calls. The servers and backend data stores are typically configured with fixed timeout parameters in an attempt to process calls in the most efficient manner possible. Occasionally, packet delays in the transport network will cause interactions between the servers and data stores to be prolonged, causing timeouts. Such timeouts in turn cause the network to drop calls. In some cases, the packet delays in the transport network are only intermittent or do not otherwise provide for excessive delay in call processing. Since the servers and data stores are configured with fixed timeout parameters, however, such network elements nevertheless timeout thereby causing more calls to be dropped than necessary. Accordingly, there exists a need in the art for an improved method and apparatus for handling network element timeouts in a packet-switched communication network.

SUMMARY OF THE INVENTION

Method and apparatus for handling timeouts in a packet-switched communication network is described. In one embodiment, at least one timeout condition of a network element is identified in the packet-switched communication network. Packet delay is determined in a transport network of the packet-switched communication network in response to the at least one timeout condition. The packet delay is compared to a threshold packet delay. A timeout parameter of the network element is automatically adjusted if the packet delay satisfies the threshold packet delay.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
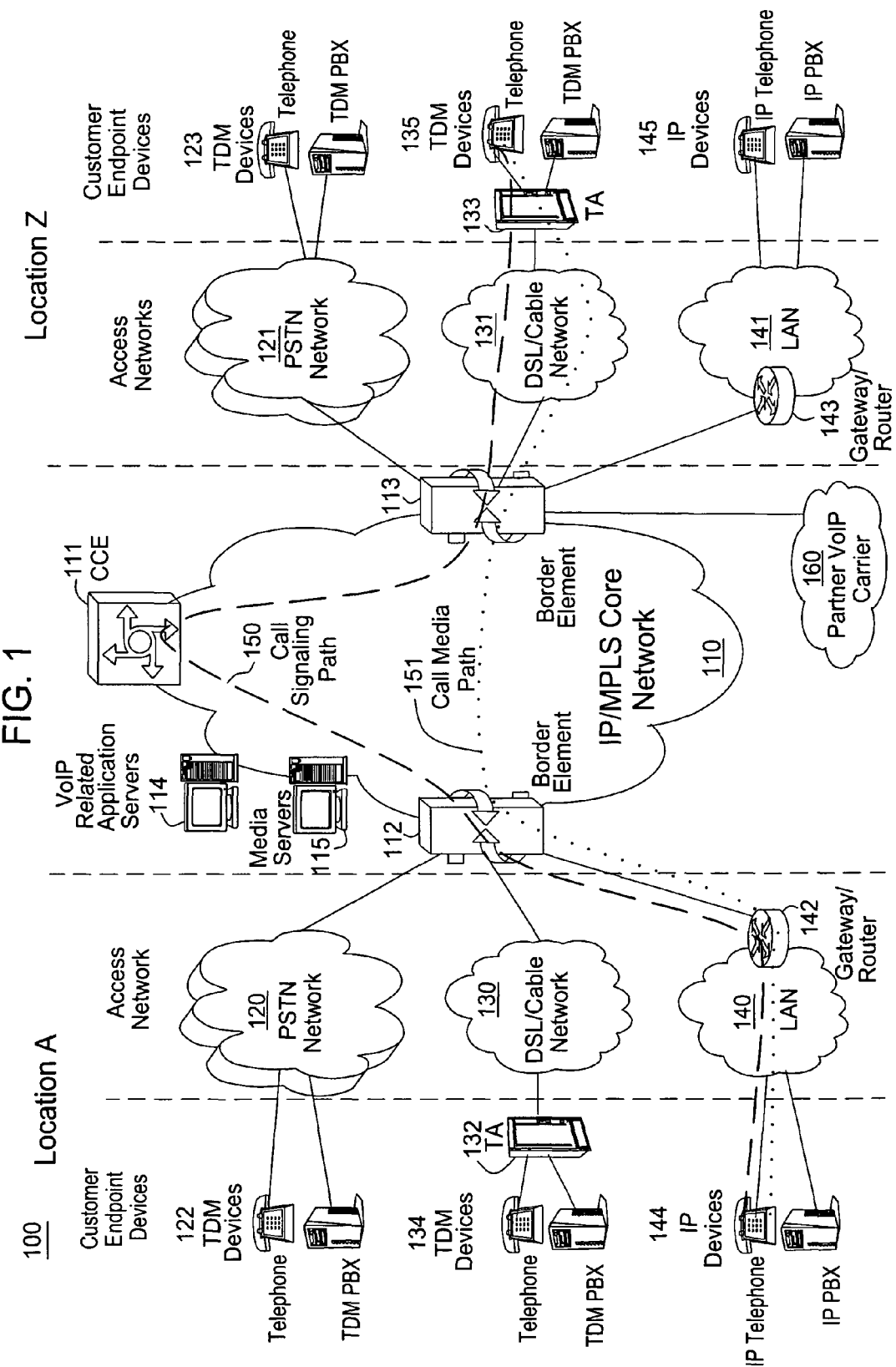
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
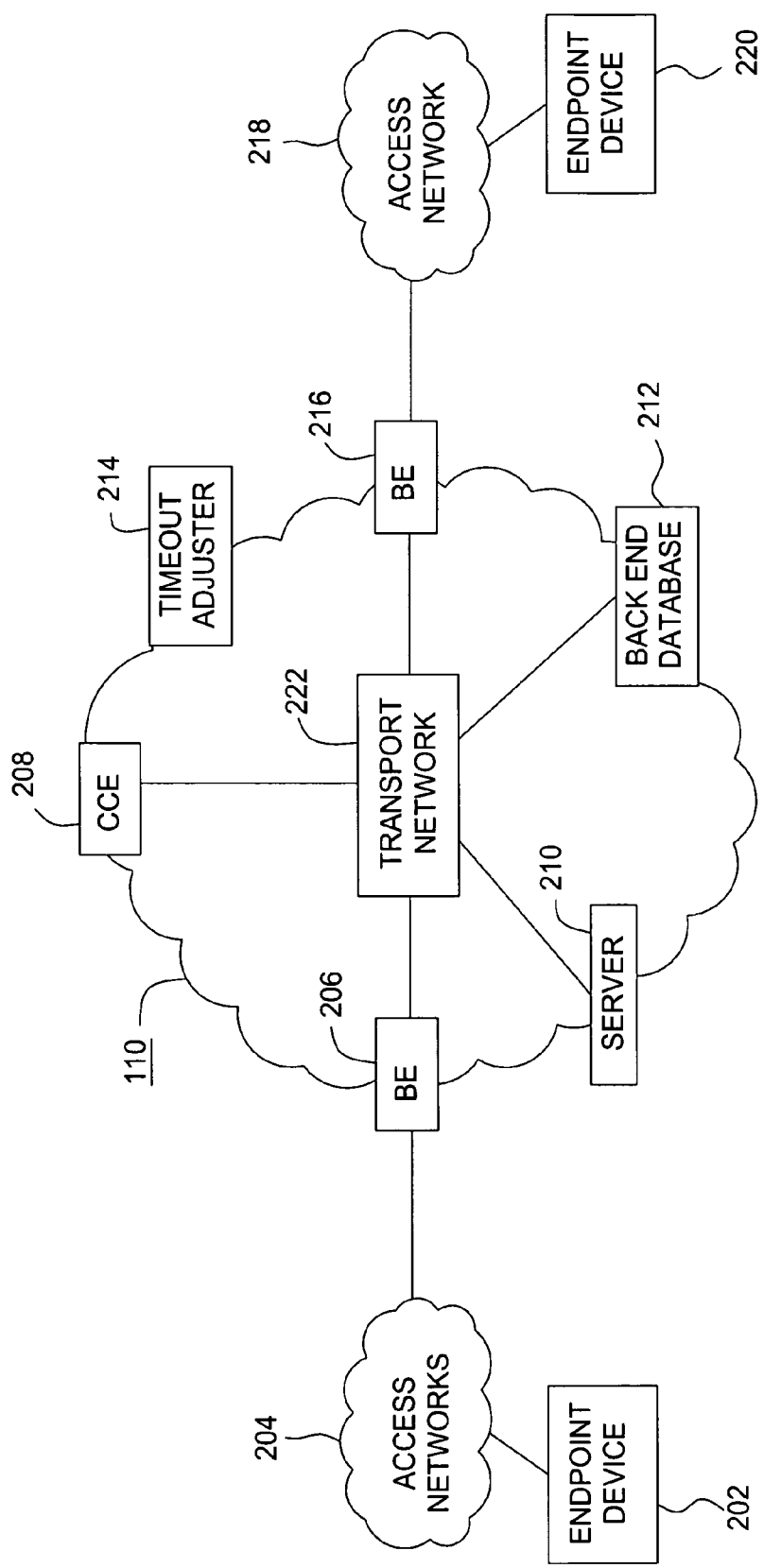
FIG. 2 is a block diagram depicting an exemplary configuration of the communication system of FIG. 2 constructed in accordance with one or more aspects of the invention.

FIG. 2 is a block diagram depicting an exemplary configuration of the communication system 100 constructed in accordance with one or more aspects of the invention. In the present embodiment, the core network 110 includes a BE 202, a BE 216, a CCE 208, a server 210, a backend database 212, a timeout adjuster 214, and a transport network 222. An endpoint device 202 is configured for communication with the core network 110 via an access network 204 and the BE 206. An endpoint device 220 is configured for communication with the core network 100 via an access network 218 and the BE 216. The endpoint device 202 and the endpoint device 220 may communicate by establishing a call through the core network 110, as discussed above. The network elements of the core network 110 (e.g., the CCE 208, the BEs 206 and 216, the server 210, the backend database 212, the timeout adjuster 214) are configured to communication among one another via the transport network 222. The transport network 222 includes various types of transport facilities known in the art, such as routers, hubs, switches, and the associated physical links therebetween.

The backend database 212 is configured to store service logic associated with the endpoint devices 202 and 220 for processing calls. Such service logic may include various types of call handling preferences and instructions, such as call routing preferences and instructions. The server 210 is configured to provide an interface to the backend database 212. In one embodiment, the server 210 comprises a web server and the backend database comprises a directory service server, such as a light weight directory access protocol (LDAP) server. As is well known in the art, LDAP is a set of protocols for querying and modifying information directories. In the present example, the information directories include directories of users and their associated call handling preferences/instructions. When the CCE 208 receives a call request from one of the endpoints 202 or 220, the CCE 208 queries the server 210 for the service logic associated with the call originator. The server 210 in turn sends a message to the backend database 212 configured to query the information directories and obtain the service logic. If the server 210 obtains the service logic, the server 210 returns the server logic to the CCE 208 and call processing continues, as discussed above.

The CCE 208, the server 210, and/or the backend database 212 may be configured with a timeout parameter. That is, if a given network element requests information from another network element, and the given network element does not receive the requested information in a predefined timeout period, the network element "times out". In response to a timeout, for example, call processing may be terminated (i.e., a call may be dropped). For example, if the CCE 208 does not receive the requested service logic from the server 210 in the predefined time period, the CCE 208 may timeout and the call that caused the request may be dropped. If the server 210 does not receive the requested service logic from the backend database 212 in a predefined timeout period, the server 210 may timeout and may indicate such a timeout to the CCE 208. If the backend database 212 cannot process the request to obtain service logic in a predefined time period, the backend database 212 may timeout and may indicate such a timeout to the server 210, which may indicate the timeout to the CCE 208.

The timeout adjuster 214 is configured to dynamically adjust the timeout parameter of one or more network elements in the core network 110, such as the CCE 208, the server 210, and the backend database 212. In particular, the timeout adjuster 214 is configured to detect timeout conditions of network elements, such as the CCE 208, the server 210, and the backend database 212. The timeout adjuster 214 determines whether the timeouts are due to packet delays in the transport network 222 or processing delays associated with the network elements. The timeout adjuster 214 may measure packet delays in the transport network using various techniques known in the art. For example, the timeout adjuster 214 may transmit one or more test packets to various network elements and record the time elapsed before receiving responses. The timeout adjuster 214 may measure processing delay by a network element using various techniques known in the art. For example, a network element may maintain a log of when requests are received and responses are sent. The timeout adjuster 214 may collect such logs from the network elements to determine processing delay. Those skilled in the art will appreciate that such processes for determining packet delay and processing delay are merely exemplary and that various other well known techniques may be employed.

If a timeout is due to a packet delay in the transport network 222, rather than a processing delay in the network element, the timeout adjuster 214 determines wither the packet delays are of an intermittent nature, or are excessive. The timeout adjuster 214 may use a packet delay threshold to determine whether the packet delays are intermittent or excessive. If a particular number of packet delays satisfy the threshold, the timeout adjuster 214 determines that the packet delays are intermittent. Otherwise, the timeout adjuster 214 determines that the packet delays are excessive. If the timeout adjuster 214 determines that the packet delays are intermittent in nature, then the timeout adjuster 214 adjusts the timeout parameter of the network element that generated the timeout. Notably, the length of timeout for the network element is increased. In this manner, the intermittent packet delays in the transport network 222 will not cause a timeout and calls will not be dropped. If the timeout was generated due to excessive packet delay, or due to processing delay in the network element, the timeout adjuster 214 does not adjust the timeout parameter of the network element. Adjusting the timeout parameter for excessive delays or for processing delays would defeat the purpose of the timeout, which is designed to process calls in the most efficient manner possible. In contrast, intermittent packet delay will have a minimal impact on call processing efficiency, thus warranting the increase of timeout parameters.

In one embodiment, the timeout parameter of a network element returns to its default value after a predefined time period. Alternatively, the timeout adjuster 214 can periodically monitor packet delay and cause the timeout parameter to return to its default value if packet delay returns to nominal values. The timeout adjuster 214 may comprise a server or like type processing device (e.g., the computer 400). Alternatively, the timeout adjuster 214 may be implemented within one of the network elements in the core network 110, such as the server 210, and thus may not be a separate element, as shown in FIG. 2. The configuration of CCE 208, server 210, and backend database 212 is merely illustrative and those skilled in the art will appreciate that other configurations are possible. For example, the CCE 208 may be configured to query the backend database 212 directly, rather than going through the server 210. While only one timeout adjuster is shown, it is to be understood that the core network 110 may include any number of timeout adjusters or timeout adjustment functions in the network elements.

Figure 3:
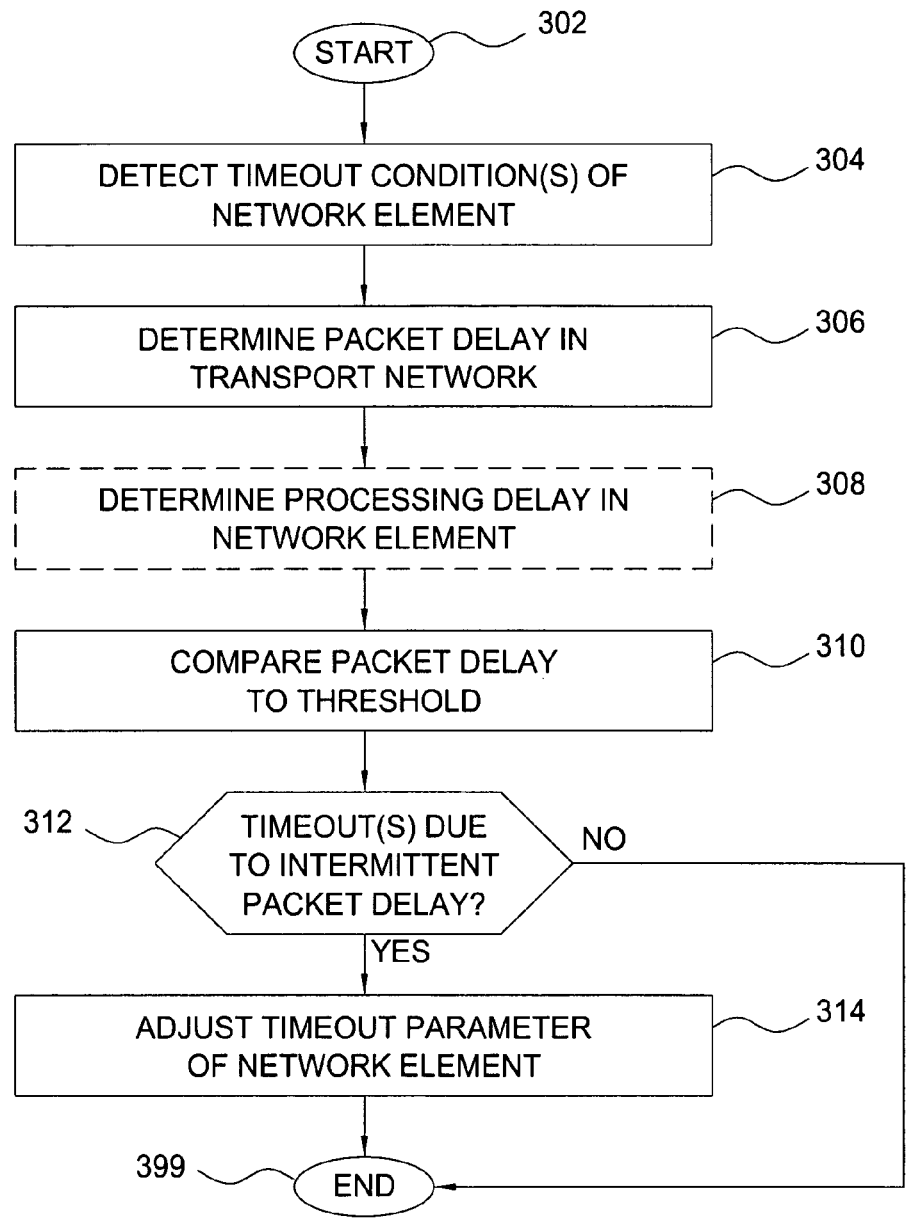
FIG. 3 is a flow diagram depicting an exemplary embodiment of a method for handling timeouts in a packet-switched communication network in accordance with one or more aspects of the invention.

FIG. 3 is a flow diagram depicting an exemplary embodiment of a method 300 for handling timeouts in a packet-switched communication network in accordance with one or more aspects of the invention. The method 300 begins at step 302. At step 304, one or more timeout conditions of a network element are detected. At step 306, packet delay in the transport network is determined in response to the timeout(s). At optional step 308, processing delay of the network element is determined. At step 310, the packet delay is compared to a threshold packet delay. At step 312, a determination is made whether the timeout(s) is/are due to intermittent packet delay. If so, the method 300 proceeds to step 314. Packet delay is intermittent if the packet delay satisfies the threshold. Otherwise, the method 300 ends at step 399. That is, the method 300 ends if the packet delay is deemed excessive (does not satisfy the threshold) or if the timeout(s) is/are due to processing delay in the network element. At step 314, a timeout parameter of the network element is adjusted. For example, the length of the timeout parameter may be increased. The method 300 then ends at step 399.

Figure 4:
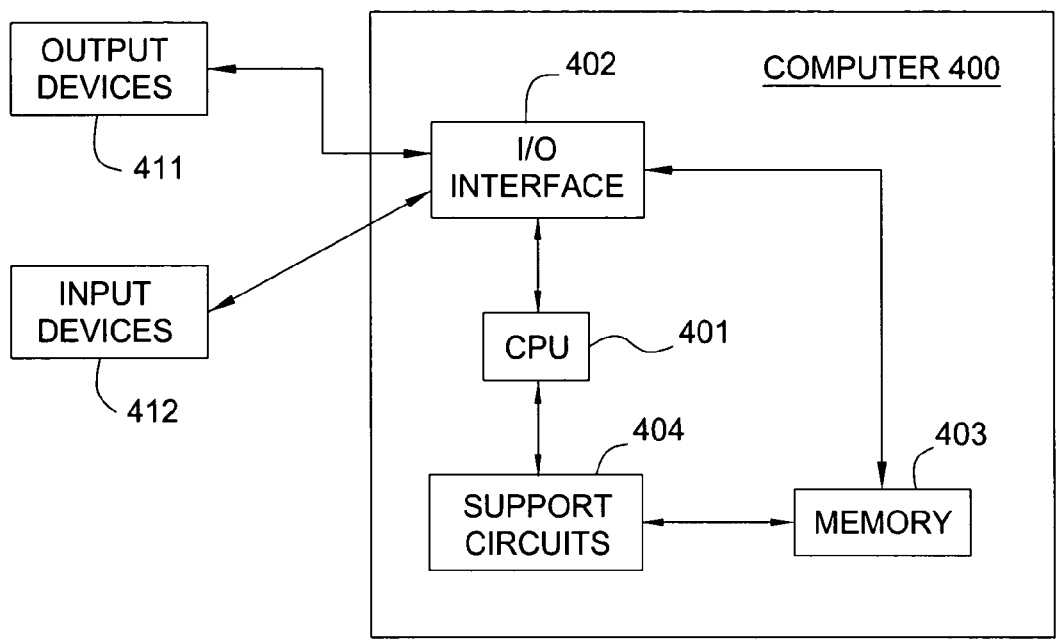
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. Notably, the computer 400 may be used to implement the timeout adjuster 214 of FIG. 2 and the method 300 of FIG. 3. The computer 400 includes a central processing unit (CPU) 401, a memory 403, various support circuits 404, and an I/O interface 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, and the like.

The memory 403 may store all or portions of one or more programs and/or data to implement the processes and methods described herein. Notably, the memory 403 may store program code to be executed by the CPU 401 for performing the method 300 of FIG. 3. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of handling a timeout condition in a packet-switched communication network, comprising:
   identifying, by a processor, the timeout condition of a call control element deployed in the packet-switched communication network, wherein the timeout condition comprises a condition where a response from a directory service server deployed in the packet-switched communication network is not received within a predefined time period, wherein the call control element is for receiving a call request, wherein the directory service server is for receiving a request for service logic data for the call request from the call control element in response to the call request, and wherein the call control element is further for invoking the timeout condition when the response to the request for service logic data is not generated by the directory service server in the predefined time period;
   determining, by the processor, a packet delay in a transport network of the packet-switched communication network in response to the timeout condition, wherein the packet delay in the transport network is determined by transmitting a test packet to the transport network;
   comparing, by the processor, the packet delay in the transport network to a threshold packet delay to determine whether the packet delay in the transport network is intermittent or is excessive;
   automatically adjusting, by the processor, a timeout parameter of the call control element associated with the predefined time period when the packet delay in the transport network is determined to be intermittent; and
   maintaining, by the processor, the timeout parameter at a current state when the packet delay in the transport network is determined to be excessive.

2. The method of claim 1, wherein the timeout parameter is increased when the packet delay in the transport network satisfies the threshold packet delay.

3. The method of claim 1, wherein the packet-switched communication network comprises an internet protocol network.

4. An apparatus for handling a timeout condition in a packet-switched communication network, comprising:
   a processor; and
   a computer-readable medium storing instructions which, when executed by the processor, cause the processor to perform operations, the operations comprising:
      identifying the timeout condition of a call control element deployed in the packet-switched communication network, wherein the timeout condition comprises a condition where a response from a directory service server deployed in the packet-switched communication network is not received within a predefined time period, wherein the call control element is for receiving a call request, wherein the directory service server is for receiving a request for service logic data for the call request from the call control element in response to the call request, and wherein the call control element is further for invoking the timeout condition when the response to the request for service logic data is not generated by the directory service server in the predefined time period;
      determining a packet delay in a transport network of the packet-switched communication network in response to the timeout condition, wherein the packet delay in the transport network is determined by transmitting a test packet to the transport network;
      comparing the packet delay in the transport network to a threshold packet delay to determine whether the packet delay in the transport network is intermittent or is excessive;
      automatically adjusting a timeout parameter of the call control element associated with the predefined time period when the packet delay in the transport network is determined to be intermittent; and
      maintaining the timeout parameter at a current state when the packet delay in the transport network is determined to be excessive.

5. The apparatus of claim 4, wherein the automatically adjusting the timeout parameter comprises increasing the timeout parameter when the packet delay in the transport network satisfies the threshold packet delay.

6. The apparatus of claim 4, wherein the packet-switched communication network comprises an internet protocol network.

7. A non-transitory computer readable medium storing instructions that, when executed by a processor, cause the processor to perform operations for handling a timeout condition in a packet-switched communication network, the operations comprising:
   identifying the timeout condition of a call control element deployed in the packet-switched communication network, wherein the timeout condition comprises a condition where a response from a directory service server deployed in the packet-switched communication network is not received within a predefined time period, wherein the call control element is for receiving a call request, wherein the directory service server is for receiving a request for service logic data for the call request from the call control element in response to the call request, and wherein the call control element is further for invoking the timeout condition when the response to the request for service logic data is not generated by the directory service server in the predefined time period;
   determining a packet delay in a transport network of the packet-switched communication network in response to the timeout condition, wherein the packet delay in the transport network is determined by transmitting a test packet only to the transport network;

comparing the packet delay in the transport network to a threshold packet delay to determine whether the packet delay in the transport network is intermittent or is excessive;

automatically adjusting a timeout parameter of the call control element associated with the predefined time period when the packet delay in the transport network is determined to be intermittent; and maintaining the timeout parameter at a current state when the packet delay in the transport network is determined to be excessive.

8. The non-transitory computer readable medium of claim 7, wherein the timeout parameter is increased when the packet delay in the transport network satisfies the threshold packet delay.

* * * * *